United States Patent [19]

Riordan et al.

[11] Patent Number: 5,153,404
[45] Date of Patent: Oct. 6, 1992

[54] FUSING APPARATUS AND METHOD USING CONCAVE SHAPED ELECTRODES

[75] Inventors: Edward D. Riordan, South Somerville; Alfred J. Bachofen, Keyport, both of N.J.

[73] Assignee: Joyal Products, Inc., Linden, N.J.

[21] Appl. No.: 653,773

[22] Filed: Feb. 11, 1991

[51] Int. Cl.$^5$ ............................................. B23K 11/00
[52] U.S. Cl. ................................. 219/56.22; 219/56.1
[58] Field of Search ............... 219/56, 56.1, 56.21, 219/56.22, 91.2, 117.1, 119, 58

[56] References Cited

U.S. PATENT DOCUMENTS

| | | | |
|---|---|---|---|
| 1,281,454 | 10/1918 | White | 219/91.2 |
| 1,586,690 | 6/1926 | Murray, Jr. | 219/119 |
| 2,890,320 | 6/1959 | Oakley | 219/58 |
| 3,761,672 | 9/1973 | Baker et al. | 219/91.2 |
| 4,388,513 | 6/1983 | Brastow et al. | 219/56 |

Primary Examiner—Geoffrey S. Evans
Attorney, Agent, or Firm—Lerner, David, Littenberg, Krumholz & Mentlik

[57] ABSTRACT

An electrode set for a fusing apparatus includes a first electrode and a second electrode each having concave shaped end faces formed from cylindrical openings. The electrode set provides enhanced fusing of magnet wire circumferentially about a terminal pin of, for example, a coiled bobbin. The heat generated during the fusing process melts the insulation on the magnet wire to permit the fusing of the wire circumferentially to the pin.

22 Claims, 3 Drawing Sheets

FUSING APPARATUS AND METHOD USING CONCAVE SHAPED ELECTRODES

BACKGROUND OF THE INVENTION

The present invention relates in general to improved fusing apparatus and methods, and more particularly, to fusing apparatus and methods for fusing magnet wire having an electrically insulating coating to a terminal using a pair of opposed electrodes having concave shaped end faces.

In the process commonly referred to as "fusing", a pair of opposed electrodes are applied to the elements of an electrically conductive workpiece, and electrical current is directed through the electrodes so as to form a bond between the workpiece elements. In this arrangement, one electrode referred to as to the "fusing" electrode engages an element of the workpiece adjacent the juncture between elements, and substantial forces are applied through this electrode so as to force the workpiece elements together. The opposite electrode, normally referred to as the "ground" electrode engages one or another of the workpiece elements remote from the juncture. The fusing electrode typically has a relatively high resistivity. An electrical potential is applied across the electrodes causing current to flow through the electrodes and the workpiece. Substantial heat is generated in the resistive fusing electrode so that heat is transferred from the fusing electrode to the engaged workpiece element. The workpiece elements fuse with one another under the combined influences of heat transferred from the fusing electrode and pressure applied by the fusing electrode. By contrast, in the bonding process referred to as spot welding, the major portion of the heat evolved during the process is generated by the electrical resistance within the workpiece itself. Both processes, however, involve application of electrical current by means of electrodes engaged with the workpiece.

Considerable difficulties have been encountered heretofore in making electrical circuit assemblies which include relatively fine wire leads which have a coating of plastic electrical insulation, commonly referred to as magnet wire. In manufacture of an electronic assembly, an electrical connection must be established between the ends of the magnet wire and metallic conductors, for example, terminal pins.

Fusing the wire magnet to the terminal pins is, however, difficult because the electrical insulation on the wire prevents electrodes used in the fusing operation from making a closed circuit. Thus, in order to fuse the magnet wire to the terminal pins, the insulation must first be stripped off of the magnet wire. Such a stripping operation is tedious and time consuming. Also, because the magnet wire is directly forcibly contacted by the electrodes, the wire size and accordingly its mechanical strength can be impaired to an extent sufficient to cause the wire to break, thereby completely destroying the current carrying capability of the wire.

There is known from Riordan et al., U.S. Pat. No. 4,687,898 a method of fusing a magnet wire to a terminal pin of an electronic assembly such as a coil bobbin which overcomes the problems and disadvantages discussed hereinabove. The terminal pin of the coil bobbin has opposed sets of notches sized, shaped and spaced so as to permit the magnet wire to be wrapped around the terminal pin in a spiral path defined by the notches. Because the magnet wire is received in the notches, the notches function to properly locate the wire on the pin and to maintain the wire stationary. The notches have a depth selected so that the portions of the magnet wire received in the notches are recessed below an outer surface of the pin, whereby electrodes used to fuse the magnet wire to the pin are allowed to contact the pin and thereby form a closed circuit. The resulting heat melts the insulation on the magnet wire to permit the fusing of the wire to the pin.

As a result of the notched construction of the terminal pin, the electrodes are prevented from engagement with the magnet wire during the fusing process. This prevents the application of a compressive force to the magnet wire so as to enhance the bond between the magnet wire and the terminal pin. This inability to compress the magnet wire during the fusing process can result in poor quality bonds which may ultimately adversely effect the performance of the electronic assembly.

There is also known from Abe, U.S. Pat. No. 4,835,356, a three electrode spot welding apparatus designed for fusing magnet wire. The apparatus includes three electrodes, the first two of which are opposed to one another whereby a workpiece, including, for example, a magnet wire and a terminal pin to be welded together, is subjected to electric resistance welding in such a manner that the workpiece is held between the first and second electrodes. The third electrode is interposed between the first electrode and the workpiece so that one distal end face of the third electrode abuts against a workpiece engaging end of the first electrode and that the other distal end face of the third electrode is in contact with the workpiece. The proximal end of the first electrode is connected to a first terminal of a power source and the respective proximal ends of the second and third electrodes are connected to a second terminal.

The power source supplies a current to heat the third electrode and remove the plastic electrical insulation by vaporization by closing a circuit having a path through the first terminal, the first electrode, the third electrode and the second terminal during a predetermined period. After removal of the electrical insulation, the power supply supplies a current to weld the magnet wire to the workpiece by closing a circuit having a path through the first terminal, the first electrode, the third electrode, the workpiece, the second electrode and the second terminal. Although the disclosed fusing apparatus is useful in fusing magnet wire, it is not suitable for fusing magnet wire over a large area, e.g., circumferentially about a terminal, to achieve greater bond strength. Thus, there have been substantial unmet needs for still further improvements in a fusing apparatus and method for magnet wire and terminal pins.

SUMMARY OF THE INVENTION

The problems and disadvantages discussed hereinabove are overcome in accordance with the present invention by providing an electrode set for fusing a first element circumferentially about a second element, the electrode set including a first electrode having a concave shaped end face and a second electrode having a concave shaped end face, the end faces of the first and second elements forming an opening therebetween when arranged proximate and opposing each other for centrally receiving the second element and circumferentially receiving the first element in contact with the concave shaped end faces of the first and second electrodes.

In accordance with another embodiment of the present invention, there is disclosed an apparatus for fusing a first element circumferentially about a second element, the apparatus including a first electrode having a concave shaped end face, a second electrode having a concave shaped end face, electrode positioning means for positioning the end faces of the first and second electrodes proximate and opposing each other to form an opening therebetween for centrally receiving the second element and circumferentially receiving the first element in contact with the concave shaped end faces of the first and second electrodes, and means for applying a fusing energy to at least one of the electrodes for fusing the second element to the first element.

In accordance with another embodiment of the present invention, there is disclosed a method of fusing together a piece of magnet wire to a terminal, the method including wrapping the piece of magnet wire about the terminal to provide a circumferential portion; positioning first and second electrode each having concave shaped end faces on opposite sides of the terminal in alignment with the circumferential portion of the piece of the magnet wire, engaging the circumferential portion of the piece of magnet wire with the concave shaped end faces of the first and second electrodes, and energizing at least one of the electrodes sufficient to fuse the magnet wire circumferentially to the terminal.

In accordance with another embodiment of the present invention, there is disclosed a method of fusing together a piece of magnet wire having electrical insulation thereon to a terminal, the method including wrapping the piece of magnet wire about the terminal to provide a circumferential portion; positioning first and second electrode each having concave shaped end faces on opposite sides of the terminal in alignment with the circumferential portion of the piece of the magnet wire, providing a third electrode in contact with the first electrode, engaging the circumferential portion of the piece of magnet wire with the concave shaped end faces of the first and second electrodes, and energizing the first and third electrodes sufficient to heat the first electrode sufficiently to remove at least a portion of the electrical insulation and to fuse the magnet wire circumferentially to the terminal.

BRIEF DESCRIPTION OF THE DRAWINGS

The above description, as well as further objects, features and advantages of the present invention will be more fully understood with reference to the following detailed description of a fusing apparatus and method using concave shaped electrodes, when taken in conjunction with the accompanying drawings, wherein.

DETAILED DESCRIPTION

Figure 1:
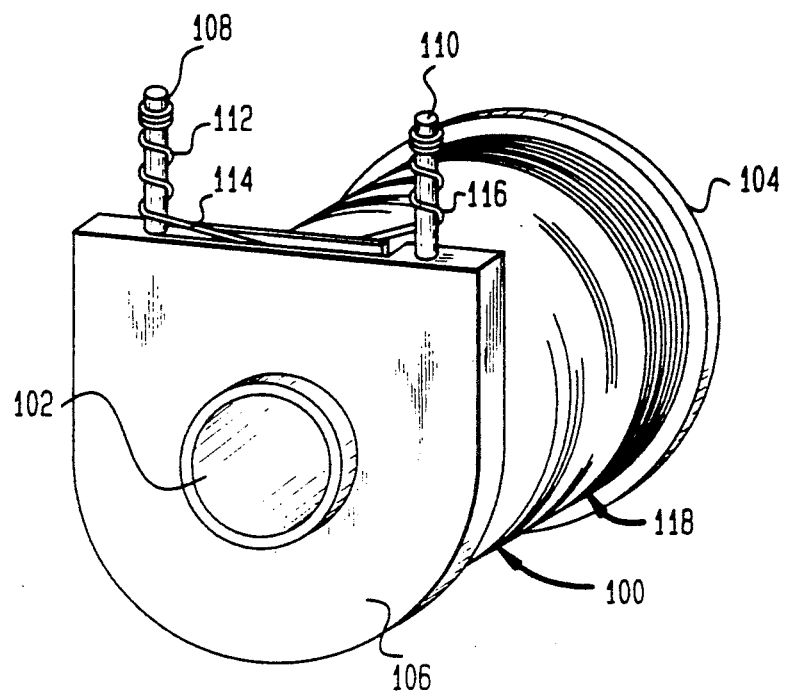
FIG. 1 is a perspective view of a coil bobbin having a pair of terminal pins to which there is fused a magnet wire in accordance with the present invention.

Referring now to the drawings wherein like reference numerals represent like elements, there is shown in FIG. 1 an electronic assembly such as a plastic coil bobbin 100 which includes a core 102, a circular flange 104 arranged at one end of the core and a semi-circular flange 106 arranged at an opposite end of the core. A pair of cylindrical rod-like terminal pins 108, 110, preferably of tinned brass, copper or the like, extend outwardly from the semi-circular flange 106. One end 112 of a piece of magnet wire 114 having an electrically insulating coating is wrapped around terminal pin 108, while another end 116 of the magnet wire is wrapped around terminal pin 110. The remainder of the magnet wire 114 is wrapped around the core 112 of the bobbin 100 to form a coil 118. The terminal pins 108, 110 generally have a circular cross-sectional shape. Although the invention herein has been described with respect to an electrical assembly such as a bobbin 100 to form a coil 118, it is to be understood that other electrical assemblies having terminals to which a magnet wire is to be fused are also contemplated.

Figure 2:
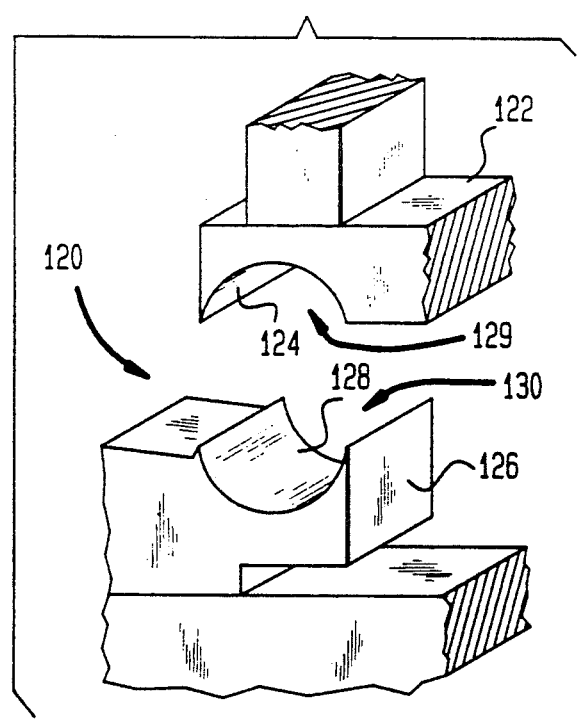
FIG. 2 is a perspective view of an electrode set constructed in accordance with one embodiment of the present invention.

Referring now to FIG. 2, the construction of an electrode set 120 in accordance with one embodiment of the present invention is set forth. The electrode set 120 includes a first electrode 122 having a concave shaped end face 124 and a second electrode 126, also having a concave shaped end face 128. The concave shaped end faces 124, 128 are formed as cylindrical segments having substantially equal radii to form respective cylindrical openings 129, 130.

Figure 3:
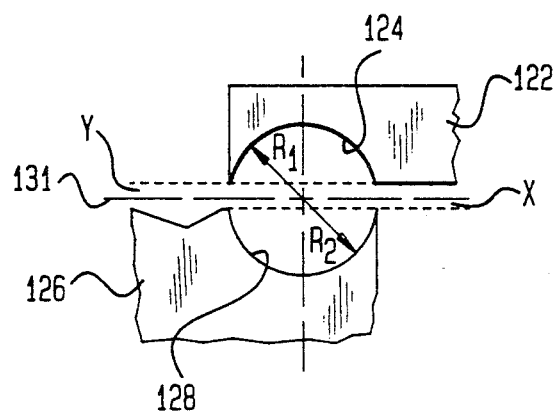
FIG. 3 is a partial front elevational view showing the electrode set having concave shaped end faces and their dimensional relationship.

More specifically as shown in FIG. 3, the concave shaped end face 124 of the first electrode 122 is constructed having a radius of curvature equal to $R_1$. Similarly, the concave shaped end face 128 of the second electrode 126 is constructed to have a radius of curvature of $R_2$. In the preferred embodiment radius $R_1$ is substantially equal to radius $R_2$. However, it is also contemplated that radius $R_1$ may be greater or less than radius $R_2$ if desired depending upon the particular application. In either event, it is preferred that the angular extent of the cylindrical opening 130 formed by the concave shaped end face 128 of the second electrode 126 be greater than the angular extent of the cylindrical opening 129 formed by the concave-shaped end face 124 of the first electrode 122. This results in the cylindrical opening 130 formed in the second electrode 126 having a greater depth than the corresponding cylindrical opening 129 formed in the first electrode 122.

As a result, the greater depth of the cylindrical opening 130 of the second electrode 126 facilitates positioning and maintaining of a terminal pin 108, 110 therein during initial placement and during the fusing process. By limiting the corresponding angular extent of the concave shaped end face 124 of the first electrode 122, the extent of surface contact with the magnet wire wrapped about the terminal pins 108, 110 during fusing is reduced a proportional amount. This proportionally reduces the amount of heat being applied to the magnet wire 114 from the first electrode 122 thereby minimizing the potential for melting away the magnet wire about the upper portion of the terminal pin 108, 110 by overheating.

By way of an illustrated example, terminal pins 108, 110 are provided having a diameter of 0.017 inches and the sum of radii $R_1$ and $R_2$ of about 0.019 inches. The terminal pins 108, 110 are wrapped with magnet wire having a size in the range of 22 gauge to 42 gauge. As shown in FIG. 3, the dimension (X) between centerline 131 which extends through the origin of radii $R_1$ and $R_2$, and the end of the second electrode 124 is in the order of 0.0010 inches. The corresponding dimension (Y) for the first electrode 122 is in the order of 0.0015 inches. This results in the depth of the cylindrical opening within the second electrode 126 being slightly greater than the corresponding depth of the cylindrical opening within the first electrode 122. It is to be understood that the aforementioned dimensions are merely illustrative of one illustrated example of the present invention, and that other dimensions may be used without departing from the spirit and scope of the present invention.

Figure 4:
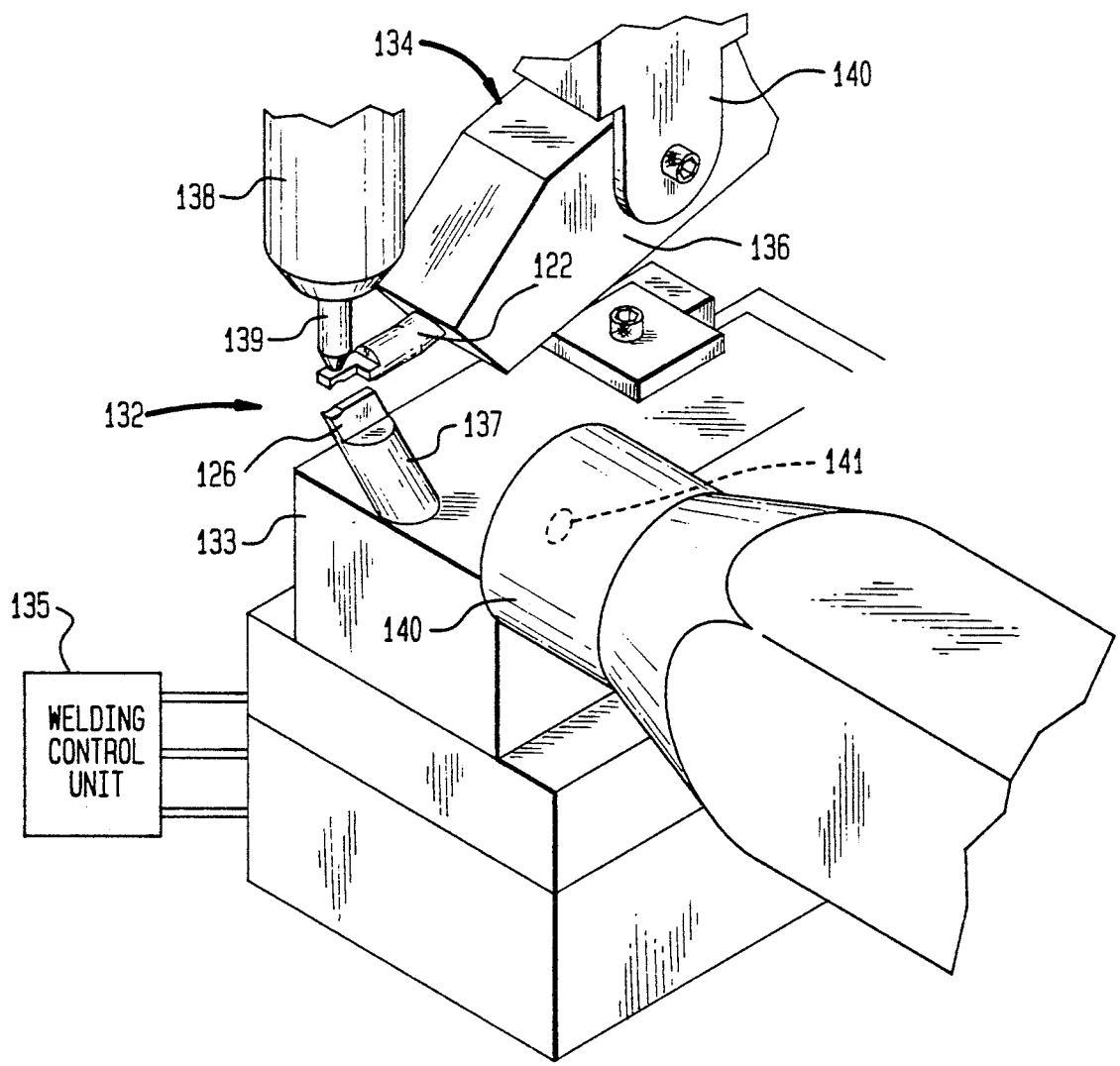
FIG. 4 is a diagrammatic illustration of a three electrode fusing apparatus having an electrode set constructed in accordance with the present invention.

Referring now to FIG. 4, there is illustrated a three electrode fusing apparatus generally designated by reference numeral 132. The fusing apparatus 132 is constructed to include a fuser head assembly 133, 134 and a welding control unit 135. The fuser head assembly 133, 134 includes a first electrode holder 136 to which there is removably attached at one end thereof the first electrode 122, a second electrode holder 137 to which there is removably attached at one end thereof the second electrode 126 and a third electrode holder 138 to which there is attached a third electrode 139. The first, second and third electrodes 122, 126, 139 are normally made of tungsten, but the second electrode 126 can be made of other materials, such as molybdenum or elkonite.

As shown, the construction of the first and second electrodes 122, 126 are as previously described and arranged opposing one another. The third electrode 139 is generally cylindrical in nature having a somewhat tapered end in contact with the first electrode 122 to provide electrical continuity therebetween. The first electrode 122 is positioned at approximately a 10° angle from the horizontal and is spring-loaded against the third electrode 139. The first and third electrode holders 136, 138 are commonly reciprocally mounted for vertical displacement by means of a reciprocating assembly generally designated by element 140.

The second and third electrodes 126, 139 are connected to one side of a step-down transformer (not shown), while the other side is connected to the first electrode 122. This allows current from the transformer to initially flow between the first and third electrodes 122, 139, and when a secondary path is open as to be described hereinafter, the current will flow between the first and second electrodes 122, 126. A further teaching of the operation of a three electrode welding apparatus may be obtained from the aforementioned U.S. Pat. No. 4,835,356.

When changing either of the first and third electrodes, 122, 138, a "burning in" of the interface between the electrodes is preferred. This results in a slight tack welding between the first and third electrodes 122, 139 to eliminate sparking at their point of contact. This is accomplished by operating the fusing apparatus 132 several times without a workpiece in place. It is to be understood that other constructions of a fusing assembly 132 may be employed with the electrode set 120 as constructed in accordance with the present invention.

The welding control unit 135 may take any conventional form of welding control capable of selectively supplying welding current pulses to the first apparatus 132. The welding control unit 135 may take the form of a Joyal Model 85M welding control unit. This welding control unit is available from Joyal Products, Inc. of Linden, N.J.

The fusing operation which takes place will typically involve a terminal pin 108 and a piece of magnet wire 114 circumferentially wrapped thereabout, it being appreciated that the magnet wire will usually take the form of a solid wire having a clear, insulating coating thereon which frequently can withstand temperatures up to and including 200° C. However, any solid wire such as associated with the lead of a conventional diode or other semiconductor device may be substituted in place of the magnet wire 114, and when the term magnet wire is employed it will be appreciated by those or ordinary skill in the art that the same only refers to a solid wire having the typical clear coating associated with wire employed to wind motors, generators, as well as those associated with various forms of transducers such as speakers and microphones. Similarly, the terminal pins 108, 110 may be any solid wire such as associated with similar components and devices.

Figure 5:
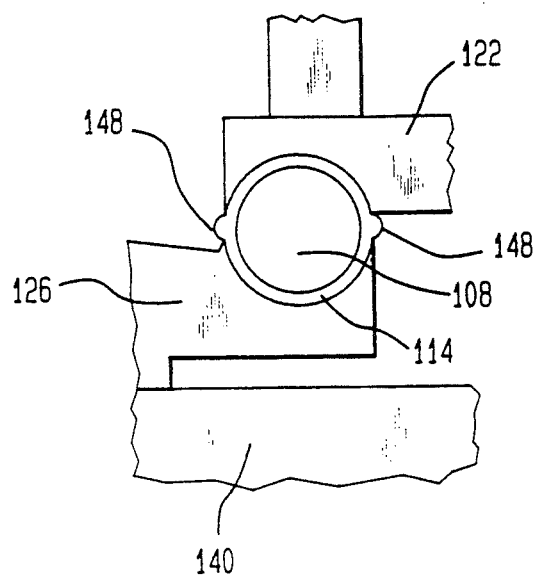
FIG. 5 is a front elevational view of the electrode set fusing a piece of magnet wire circumferentially to a terminal pin in accordance with the method of the present invention.

Referring to FIG. 5, the fusing of a piece of magnet wire 114 to a terminal pin 108 will now be described. Once the magnet wire 114 and the terminal pin 108 are placed within the cylindrical opening 130 formed in the second electrode 126, the first and third electrodes 122, 139 are brought down under control of the welding control unit 135 by means of a welding firing switch which also initiates heating of the first electrode 122. The first electrode 122 is initially heated under control of the welding control unit 135 by application of current from one side of the transformer through the first and third electrodes 122, 139. The second electrode 126 being in contact with the electrical insulation on the magnet wire 114 is not part of the current path. By the time the first electrode 122 makes contact with the magnet wire 114, it has been heated to a sufficient temperature to enable vaporization of the electrical insulation from the magnet wire 114. Once the electrical insulation has been removed, the second electrode 126 contacts the core of the magnet wire 114 to form a current path between the first electrode 122 and second electrode 126 to effect bonding. It can therefore be appreciated that the primary function of the third electrode 139 is to effect heating of the first electrode 122 so that the latter can vaporize or burn off the electrical insulation from the magnet wire 114.

As a result of the foregoing operation, the magnet wire 114 will be fused circumferentially about the terminal pin 108 to ensure electrical continuity therebetween. The compressive force applied by the cooperative relationship between the first electrode 122 and second electrode 126 results in a circumferential portion of the magnet wire 114 being squeezed outwardly between the electrodes in the form of ears 148. The formation of the ears 148 results from maintaining the first electrode 122 spaced slightly from the second electrode 126 which ensures that the compressive force is fully applied to the magnet wire 114 and is not limited by the first electrode abutting the second electrode.

There are a number of control parameters in the heating process using the welding control unit 135 which may be set by trial and error. For example, a sequence timer within the welding control unit 135 controls the length of time the fuser head assembly 133, 134 is down to engage the magnet wire 114. The sequence timer is set so that the fuser head assembly 133, 134 stays down for the duration of the welding process.

The welding control unit 135 can also vary the rate and time of welding. For example, the welding unit control 135 a number of related settings, which may also be set by trial and error as follows:

Weld Count - Time in cycles when full top current is applied. When using a thermal monitor as to be described, this switch is taken out of the circuit by means of a dip switch inside the welding control unit 135.

Up-Slope Count - Time in cycles when current is gradually climbing from slope bottom current to top current.

Slope Bottom Current - Percent of current where heat begins.

Top Current - Percent of current where heat ends. This setting is changed to adjust the rate of heating. Usually a slow heating is desirable.

A thermal monitor 140 can be used to control the temperature to which the first electrode 122 is heated and the length of time it stays at the set temperature. This is achieved by focusing a fiber optic probe 141 at the first electrode 122 when it is in the down position. The temperature setting on the thermal monitor 140 is set for the heat desired. One such thermal monitor 140 and its method of use is further disclosed in U.S. Pat. No. 4,224,496.

Figure 6A:
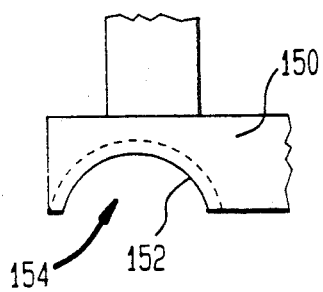
FIG. 6A is a front elevational view of one electrode of the electrode sets constructed in accordance with another embodiment of the present invention.
Figure 6B:
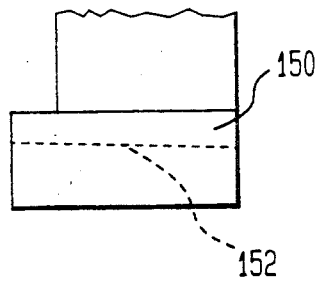
FIG. 6B is a left side elevation view of the electrode shown in FIG. 6A.

Referring now to FIGS. 6A and 6B, there is shown a first electrode 150 in accordance with another embodiment of the present invention. The first electrode 150 is formed with a concave shaped end face 152 which forms a cylindrical opening 154 which is tapered from front to back. By way of example, the taper of the cylindrical opening 154 is in the order of 0.0005 inches. The tapered cylindrical opening 154 allows the material of the magnet wire 114 to flow backward to prevent severing of the magnet wire during fusing under compression of the first electrode 12 and to ensure an adequate bond with the terminal pin 108.

Although the invention herein has been described with references to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. An electrode set for fusing a first element circumferentially about a second element, said electrode set comprising a first electrode having a concave shaped end face and a second electrode having a concave shaped end face, the end faces of the first and second elements forming an opening therebetween when arranged proximate and opposing each other for centrally receiving said second element and circumferentially receiving said first element in contact with the concave shaped end faces of the first and second electrodes, the concave shaped end faces of the first and second electrodes comprising cylindrical segments having substantially equal radii and the angular extent of said cylindrical segments being different from one another.

2. The electrode set according to claim 1, wherein said opening formed from the end faces of the first and second elements is cylindrical.

3. The electrode set according to claim 1, wherein said cylindrical segment of said first electrode is uniformly tapered along the length thereof.

4. An apparatus for fusing together a piece of magnet wire having electrical insulation circumferentially about a terminal, said apparatus comprising a single pair of electrodes including a first electrode having a concave shaped end face and a second electrode having a concave shaped end face arranged directly facing said face of said first electrode, electrode positioning means for positioning the end faces of the first and second electrodes directly facing each other on opposite sides of said terminal to form a cylindrical opening therebetween for centrally receiving said terminal and circumferentially receiving said piece of magnet wire in contact with the concave shaped end faces of the first and second electrodes, and means for heating said electrodes sufficiently to remove at least a portion of said electrical insulation by applying a fusing energy across the opposing first and second electrodes arranged on opposite sides of the terminal for fusing said magnet wire circumferentially to said terminal upon removal of at least a portion of said electrical insulation.

5. The apparatus according to claim 4, wherein said opening formed from the end faces of the first and second electrodes is cylindrical.

6. An apparatus for fusing together a piece of magnet wire having electrical insulation circumferentially about a terminal, said apparatus comprising a first electrode having a concave shaped end face, a second electrode having a concave shaped end face, the concave shaped end faces of the first and second electrodes being cylindrical segments, the angular extent of said cylindrical segments being different from one another, electrode positioning means for positioning the end faces of the first and second electrodes opposing each other on opposite of said terminal to form an opening therebetween for centrally receiving said terminal and circumferentially receiving said piece of magnet wire in contact with the concave shaped end faces of the first and second electrodes, and means for applying a fusing energy across the opposing first and second electrodes for fusing said magnet wire circumferentially to said terminal upon removal of at least a portion of said electrical insulation.

7. The electrode set according to claim 6, wherein said cylindrical segments have substantially equal radii.

8. The electrode set as set forth in claim 6, wherein said cylindrical segment of said first electrode is uniformly tapered along the length thereof.

9. The apparatus of claim 6, further including a third electrode in contact with one of said first and second electrodes.

10. An apparatus for fusing together a piece of magnet wire having electrical insulation circumferentially about a terminal, said apparatus comprising a first electrode having a concave shaped end face, a second electrode having a concave shaped end face, the concave shaped end faces of the first and second electrodes being cylindrical segments, said cylindrical segment of said first electrode uniformly tapered along the length thereof, electrode positioning means for positioning the end faces of the first and second electrodes each other on opposite sides of said terminal to form a cylindrical opening therebetween for centrally receiving said terminal and circumferentially receiving said piece of magnet wire in contact with the concave shaped end faces of the first and second electrodes, and manes for applying a fusing energy across the opposing first and second electrodes sufficient to heat said electrodes for fusing said magnet wire circumferentially to said terminal upon removal of at least a portion of said electrical insulation.

11. The apparatus according to claim 10, wherein said cylindrical segments have substantially equal radii and the angular extent of said cylindrical segments are different from one another.

12. A method of fusing together a piece of magnet wire to a terminal, said method comprising wrapping said piece of magnet wire about said terminal to provide a circumferential portion; positioning first and second electrode each having concave shaped end faces on opposite sides of said terminal in alignment with said circumferential portion of said piece of said magnet wire, engaging said circumferential portion of said piece of magnet wire with the concave shaped end faces of the first and second electrodes, and energizing at least one of the electrodes sufficient to fuse said magnet wire circumferentially to said terminal.

13. The method according to claim 12, further including maintaining the end faces of the first and second electrodes from contacting each other during the fusing of said magnet wire to said terminal pin.

14. The method according to claim 12, wherein the end faces of the first and second electrodes form therebetween a cylindrical opening when arranged on opposite sides of said terminal pin.

15. The method according to claim 12, wherein the concave shaped end faces of the first and second electrodes are cylindrical segments.

16. The method according to claim 12, wherein said cylindrical segments have substantially equal radii.

17. The method according to claim 12, wherein the angular extent of said cylindrical segments are different from one another.

18. The method according to claim 12, wherein said cylindrical segment of said first electrode is uniformly tapered along the length thereof.

19. The method according to claim 12, wherein said cylindrical segments have substantially equal radii and the angular extent of said cylindrical segments are different from one another.

20. The method according to claim 19, further including removing a portion of said electrically insulating coating from said magnet wire in contact with the end faces of the first and second electrodes during energizing at least one of the electrodes.

21. The method according to claim 12, wherein said magnet wire has an electrically insulating coating thereon.

22. A method of fusing together a piece of magnet wire having electrical insulation thereon to a terminal, said method comprising wrapping said piece of magnet wire about said terminal to provide a circumferential portion; positioning first and second electrode each having concave shaped end faces on opposite sides of said terminal in alignment with said circumferential portion of said piece of said magnet wire, providing a third electrode in contact with said first electrode, engaging said circumferential portion of said piece of magnet wire with the concave shaped end faces of the first and second electrodes, and energizing said first and third electrodes sufficient to heat said first electrode sufficiently to remove at least a portion of said electrical insulation and to fuse said magnet wire circumferentially to said terminal.

* * * * *

UNITED STATES PATENT AND TRADEMARK OFFICE
CERTIFICATE OF CORRECTION

PATENT NO. : 5,153,404
DATED : October 6, 1992
INVENTOR(S) : Riordan et al

It is certified that error appears in the above-indentified patent and that said Letters Patent is hereby corrected as shown below:

```
Column 6, line 21, "wire" should read --wires--.
Column 7, line 42, "12" should read --122--.
Column 8, line 27, "4" should read --6--.
Column 8, line 40, after "opposite" insert --sides--.
Column 9, line 3, "manes" should read --means--.
```

Signed and Sealed this

Twenty-fourth Day of May, 1994

Attest:

BRUCE LEHMAN

*Attesting Officer*     *Commissioner of Patents and Trademarks*